Nov. 7, 1950 P. A. BORDEN 2,529,070
MEAN VELOCITY INDICATOR
Filed Dec. 8, 1945
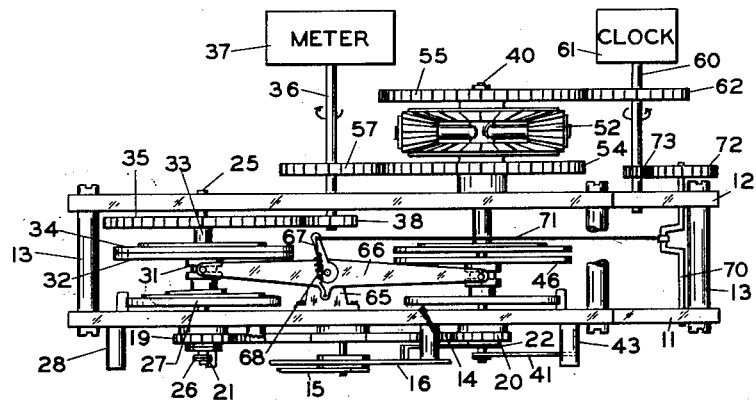
FIG. 2
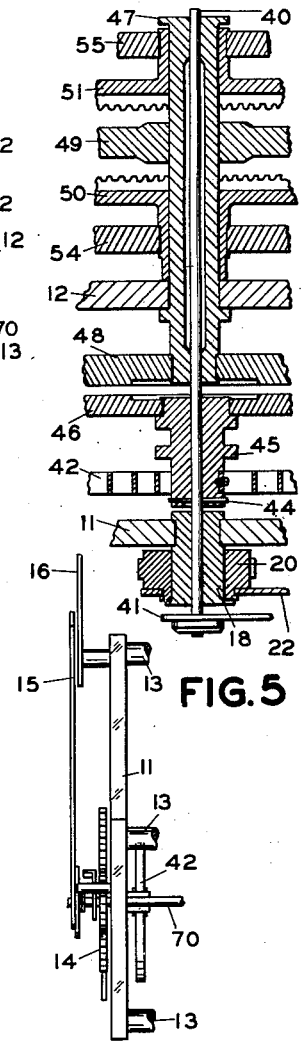
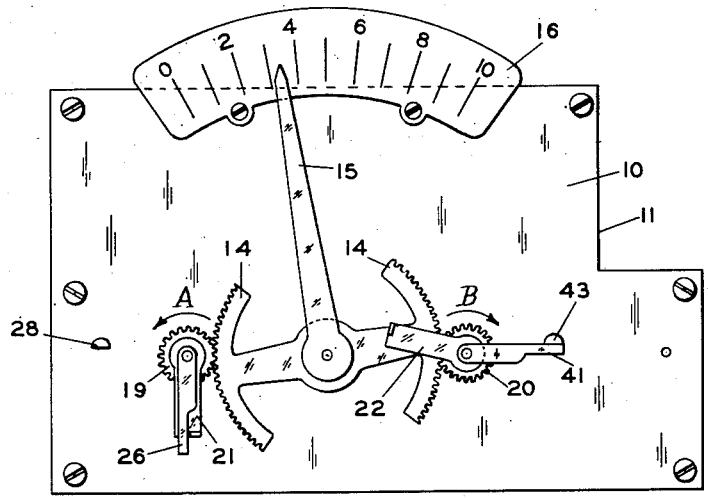
FIG. 1
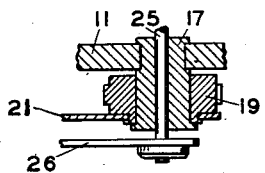
FIG. 3
FIG. 4
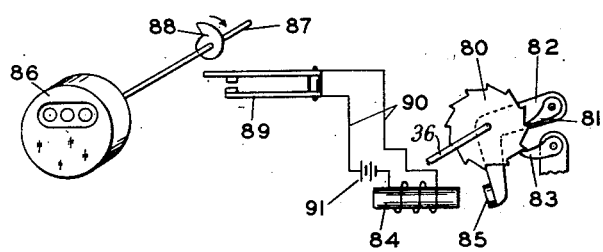
FIG. 6
INVENTOR.
Perry A. Borden
BY
E. C. Sanborn
Attorney Patented Nov. 7, 1950

2,529,070

UNITED STATES PATENT OFFICE 2,529,070

MEAN VELOCITY INDICATOR

Perry A. Borden, Woodbury, Conn., assignor to The Bristol Company, Waterbury, Conn., a corporation of Connecticut Application December 8, 1945, Serial No. 633,807

9 Claims. (Cl. 235—61)

This invention relates to velocity indicators, and more especially to a device for providing a measure of the average velocity of a rotating member or equivalent whose movement may be slow or irregular in its nature. For the determination of velocities of rotating shafts and the like, there are many devices utilizing centrifugal force or electromagnetic induction, whereby a movable element is positioned in accord with the angular velocity of a driving member; but the power available for such measurements falls off rapidly with reduction of speed, so that at low velocities, of the order of a few revolutions per minute, or in installations where the driving force is limited, such methods generally become impracticable.

An outstanding example of a device having a rotating shaft whose velocity is normally relatively slow, and which it is desirable to measure, is found in displacement meter, such as is used in determining the flow of liquids and gases. Such a meter is usually provided with a register having a group of pointers whose advance with respect to associated scales may be expressed as a measure of the total volume of fluid which has passed. In determining the flow of certain viscous fluids, such a meter is often the only type which can be utilized; and, while the reading of the meter is normally representative of an integration of flow over a period of time, the determination of instantaneous (or short-time) rates of flow, requires what is the mathematical equivalent of differentiation of the advance of the meter. A device which to a certain extent accomplishes this purpose is exemplified in U. S. Letters Patent No. 2,329,370, granted to the applicant and J. R. Hicks, September 14, 1943.

In the determination of maximum demand in electric power circuits, it is customary to associate with a watthour meter a mechanism in which a deflecting device is steadily advanced by the meter for a predetermined time interval, quickly reset to its zero, and subsequently reengaged with the meter mechanism for another deflection. An index or other means provides a measure of the maximum of the deflections attained, and this represents the desired magnitude. A somewhat similar principle is found in the "Chronometric tachometer" (Experimental Mechanical Engineering: Diedrichs & Andrae: Wiley, 1930: vol. I, page 57).

Again, in that branch of electrical telemetering known as the "high-rate-impulse" system, in which impulses are transmitted at a rate directly proportional to the speed of a watthour meter, the translation of those impulses into a magnitude proportional to that speed, and therefore to the rate of power flow through the meter, requires accessory apparatus of a rather intricate nature. This has been accomplished mechanically by a device known as the "ball-type" receiver, (see Smith, B. H., & Pierce, R. T.: Trans. A. I. E. E. XLIII (1924) pages 306–307), and also by an electrical system involving the repeated charging and discharging of a capacitor.

It is an object of the present invention to provide a device which will effect a measurement of the mean velocity of a slowly or intermittently advancing element, and in which the measuring function is being performed during substantially the whole time said element is in motion.

It is a further object to provide a device of the above nature, having an exhibiting member to indicate with reference to a suitable scale the magnitude under measurement, and in which said exhibiting member is subjected to quantitative and significant positioning influences in both directions with respect to said scale.

It is a further object to provide a device of the above nature which shall be wholly mechanical in its principle, thus eliminating electrical contacts and accessories, generally objectionable where inflammable fluids are being metered.

It is a further object to provide a device of the above nature employing only the simplest mechanical elements and devoid of ratchets, cams and detents.

It is a further object to provide a device of the above nature which shall be readily adaptable to a wide variety of types and ranges of metering devices.

It is a further object to provide a device of the above nature which shall not be adversely affected by vibration and changes in operating position.

It is a further object to provide a device of the above nature in which the deflection of the index, pointer or equivalent exhibiting member shall bear an inherently linear relationship to the velocity under measurement.

Another object is the provision of apparatus of simple and rugged construction for attaining the foregoing objectives.

In implementing the purposes of the invention, it is proposed to establish equal intervals of time by means of a suitable constant-speed device, and alternating the action in successive intervals so that during one of said intervals a deflecting member is advanced at a speed directly representative of the velocity under measurement, and during the succeeding interval another deflecting member is advanced at a speed representative of that by which the measured velocity falls short of a predetermined constant velocity, an exhibiting member being subject to positioning by the joint influence of said deflecting members and with respect to a measuring scale at an excursion representative of the mean speed under measurement during both of said successive intervals.

Other features of the invention will be hereinafter described and claimed.

In the drawings:

Figs. 1, 2, and 3 are, respectively, a front elevation, a top elevation and a partial end elevation, of a mechanism embodying the principles of the invention.

Figs. 4 and 5 are sectional views to an enlarged scale, of elements of the mechanism shown in the previous figures.

Fig. 6 is a diagrammatic representation of an alternative form of an element of the invention.

A mounting frame 10 is provided by the combination of a front plate 11 and a back plate 12 coordinated into an integral assembly by fixed spacing pillars 13. Pivotally mounted on the front plate 11 for deflection through a limited angle is a gear member 14 (which may consist, as shown, of a pair of opposed sectors each subtending an angle corresponding to that through which said member is adapted to deflect), and attached to the gear member 14 is an index or pointer 15 cooperating with a graduated scale 16 fixed to the front plate 11 to provide a measure of the deflected positions of the gear member 14.

Substantially diametrically opposed with respect to the gear member 14 are fixed in the front plate 11 forwardly projecting studs 17 and 18 (see Figs. 4 and 5), each having both internal and external journal surfaces. On the said external surfaces are rotatably mounted pinion members 19 and 20 respectively, each meshing with a portion of the toothed profile of the gear member 14. Attached to the pinion member 19 is a radially extended arm 21 having a short forwardly-directed axial projection, and attached to the pinion 20 is a similar radial arm 22, also having an axial projection. Since both said pinions are in mesh with the gear member 14, it follows that they will partake of identical angular rotation, so that the angular relationship between the arms 21 and 22 will be constant. The actual setting of said arms with respect to each other and to the parts with which they are associated will presently be set forth.

Rotatably mounted within the stud 17, and extending through an aligned journal in the back plate 12, is a shaft or spindle 25 free for limited displacement in an axial sense, and having on its front extremity a radial arm 26 adapted to engage the axial projection on the arm 21 to rotate the pinion 19 in a counter-clockwise sense, as indicated by the arrow A in Fig. 1. Extended between the shaft 25 and a suitable abutment on the front plate 11 is a spiral spring 27 tending at all times to rotate said shaft about its axis in a clockwise sense, such rotation being limited by a stop 28 definitely positioned on the front plate 11 and in the path of the arm 26. Fixed to the shaft 25 is a grooved collar 31 having integral therewith a clutch plate 32, said collar providing means whereby said shaft including said clutch plate may be axially displaced through a short distance without interfering with its rotary motion.

Freely rotatable on the rearward portion of the shaft 25 is a hub 33 carrying a clutch plate 34 adapted for frictional driving engagement with the plate 32, and also a gear member 35 integral with said hub. Journalled in the back plate 12 is a shaft or spindle 36 adapted to be driven either directly as shown, by a a meter 37 or otherwise (as hereinafter to be disclosed) at a speed directly proportional to the velocity to be measured. Mounted on the shaft 36 is a gear 38 meshing with the gear 35, whereby the latter and also the clutch plate 34 will be driven at a speed proportional to said velocity.

Rotatably mounted within the stud 18 and extending through and beyond the back-plate 12 is a shaft or spindle 40 free for limited displacement in an axial sense and carrying on its front extremity a radial arm 41 adapted to engage the axial projection on the arm 22 to rotate the pinion 20 in a clockwise sense, as indicated by the arrow B in Fig. 1. Extended between the shaft 40 and a suitable abutment on the front plate 11 is a spiral spring 42 tending at all times to rotate said shaft about its axis in a counter-clockwise sense, such rotation being limited by a stop 43 definitely positioned on the front plate 11 and in the path of the arm 41. The positions assumed by the arms 26 and 41 when resting against their respective stops 28 and 43 determine the settings of the arms 21 and 22. As hereinbefore pointed out, said last-named arms will maintain a constant mutual angular relationship. Thus, the sum of the angles between these arms and the arms 26 and 41 when resting against their stops will be constant. In determining the positions which the arms 26 and 41 shall occupy when fixed to the respectively associated pinions, the sum of said angles is made to bear to the total angle through which the pointer 15 is to be deflected the same ratio as exists between the pitch diameter of either of said pinions and that of the gear member 14.

Understanding of the details of the assembly associated with the shaft 40 will be clarified by reference to Fig. 5. Secured to the shaft 40, as by a taper pin 44, is a grooved collar 45 (which may conveniently also form a hub for the spring 42), and integrally attached to said collar is a clutch plate 46, said collar providing means whereby said shaft, including said clutch plate, may be axially displaced through a short distance without interfering with its rotary motion. Journalled in the back plate 12, and having an extension rearwardly therefrom, is a hollow shaft member 47 providing on its interior portion one or more bearings for the shaft 40, and having secured to its forward end a clutch plate 48 adapted for frictional driving engagement with the plate 46. The rearward extension of the hollow shaft 47 forms the axis of a differential gear train having a planetary member 49 secured to said shaft and integrally rotatable therewith. Freely rotatable on the shaft 47, and disposed on opposite sides of the planetary member 49 are bevel gears 50 and 51, the same being adapted to mesh with bevel pinions 52 pivoted on said planetary member, thereby to constitute an epicyclic or differential gear train. Secured to the gear 50 and integrally rotatable therewith is a spur gear 54, and similarly secured to the gear 51 is a spur gear 55. The gear 54 meshes with a gear 57 attached to the meter shaft 36; and gear ratios and rotation directions are so chosen that with normal rotation of the meter shaft 36 the gears 35 and 54 will both rotate in a counter-clockwise sense as viewed from the front of the assembly, the latter rotating with twice the angular velocity of the former.

Journalled in the back plate 12 is a shaft 60 adapted to be driven at a constant speed by means of a clock or equivalent mechanism 61 and carrying a pinion or gear member 62 which meshes with the gear member 55. The rotation direction and gear ratio are made such that the gear member 55 will rotate in a clockwise sense as viewed from the front of the assembly and at a speed equal to that at which the gear member 54 would be rotated when the meter 37 in operating at its full load, or at a velocity corresponding to the maximum velocity represented by the graduations on the scale 16.

A bracket 65 carried upon the rearward face of the front plate 11 midway between the studs 17 and 18, has pivotally mounted thereon for limited angular deflection in a plane parallel to the axes of the shafts 25 and 40 an extended arm 66 with its extremities conformed to cooperate with the grooves in the collars 31 and 45 to move said collars and attached parts, including the shafts 25 and 40 and the clutch plates 32 and 46, in opposite senses (one forward and the other back) when said arm is angularly displaced about its mounting on said bracket. Mounted on the bracket 65 for limited angular deflection about an axis, which may coincide with that of the arm 66 is an arm 67 having a pivot point radially displaced from its axis of rotation. Extended between said pivot point and a point of attachment on the arm 66, is a spring member 68. The relative arrangement of said spring member and its attachments to said arms is such that its line of action will be shifted with deflection of the arm 67 to pass from one side to the other of the axis of the arm 66, thereby providing a toggle or snap action wherein the arm 66 will be quickly thrown from one to the other of its extreme positions. Thus, if the arm 67 be moved symmetrically about a neutral position wherein said line of action intersects said axis, the clutches comprising the plates 32—34 and the plates 46—48, respectively, will be alternatively and abruptly engaged and disengaged.

Journalled between the plates 11 and 12 is a cranked shaft 70 operatively connected to the arm 67 by means of an extended link 71, so proportioned that with rotation of said shaft said arm will be displaced through an angle bisected by the line of action of the spring 68 as it intersects the axis of rotation of the arm 66, with the result that, if the shaft 70 be rotated at a uniform angular velocity, the arm 66 will be successively deflected in opposite senses at equal intervals of time. Secured to the shaft 70 to drive the same is a gear member 72, meshing with a pinion or gear member 73 on the clock shaft 60, whereby to rotate the shaft 70 at a constant speed. The preferred speed of said shaft with respect to other elements of the mechanism will presently be set forth.

In studying the performance of the invention, consideration may first be given to conditions existing with the clock or timing motor running at its normally constant speed and the meter 37 at rest, corresponding to a condition of zero load or velocity to be measured. The clock shaft 60, acting through the gears 73 and 72 will cause the shaft 70 to be rotated and the link 71 actuated by the cranked portion thereof to operate the arm 67 in a manner to throw the driving clutches alternatively in and out of gear for uniform intervals as hereinbefore explained. At the same time, the gear 62 will drive the gear 55 in a clockwise sense, and, the bevel gear 50 being at rest, the bevel gear 51 will cause the bevel pinions 52 to run upon the gear 50, imparting to the planetary member 49 and to the hollow shaft 47 an angular motion in said clockwise sense; and having a velocity half that of the gear 55. The clutch plate 48 will partake of the motion of the shaft 47 and will be similarly rotated. Considering the first-named interval of time when the clutch plates 48 and 46 are separated, the spring 42 acting through the collar 45 will cause the shaft 40 to be maintained in its position of maximum counter-clockwise displacement, as determined by engagement of the arm 41 with the stop 43. At the same time, while the clutch plates 32 and 34 are in mutual engagement, the latter being stationary due to the meter 37 being at rest, the former will have no rotary motion imparted to it, and no consequent tendency to rotate the shaft 25 away from its zero position as determined by engagement of the arm 26 with the stop 28. As rotation of the shaft 70 causes the arm 67 to be displaced, beyond the neutral position as hereinbefore described, the extended arm 66 under the influence of the spring 68 will be abruptly moved in a sense to disengage the clutch plates 32—34 and bring the clutch plates 46—48 into operative frictional engagement, thus terminating the first time interval. Unless the arm 26 has previously been displaced from its zero position of engagement with the stop 28, no motion of the shaft 25 will take place. If, for any reason, said arm has been displaced from said stop, the shaft 25 under the influence of the spring 27 will be immediately reset to the aforesaid zero position. Engagement of the clutch plates 48—46 will cause the latter plate to have imparted to it an angular motion corresponding to that of the former, that is to say the shaft 40 will begin to rotate in a clockwise sense at the velocity of the clutch plate 48, and the arm 41 will leave the stop 43 and excurse in said clockwise sense. As the arm 41 advances, it will eventually engage the projection on the arm 22 and will cause said arm to partake of its angular motion. The pinion 20 will accordingly cooperate with the gear member 14 to rotate the same in a counter-clockwise sense and displace the pointer 15 toward the left-hand end of the scale 16. At the same time, the pinion 19, with its attached arm 21, being driven by the gear member 14, will rotate freely on the hub 17, and will partake of an angular displacement identical with that of the pinion 20. At the end of the second time interval under consideration as determined by rotation of the shaft 70, the arm 22 and gear 20 will have been turned sufficiently by arm 41 to restore pointer 15 to the zero point on the scale 16, and the arm 66 will again be thrown to a position wherein the clutch plates 48—46 will be mutually disengaged and the clutch plates 32—34 reengaged. Disengagement of the first-named clutch plates will leave the shaft 40 and attached parts free to be returned by the spring member 42 to the zero position as determined by engagement of the arm 41 with the stop 43. The pinions 19 and 20 with attached arms 21 and 22, respectively, and the gear member 14 with the pointer 15 will remain in the positions attained at the time of release of the clutch; and the indication of said pointer will represent the zero point of the scale 16.

Let it now be assumed that the meter 37 is in operation under full load conditions, so that the shaft 36 is rotating at a speed corresponding to the maximum range of the instrument. Under this condition, the gear 54 will be rotating at the same speed as, and in the opposite direction to, the gear 55, and the corresponding bevel gears 50 and 51, respectively, will partake of said rotations, with the result that the planetary member 49 and the hollow shaft 47, together with the clutch plate 48 will remain at rest. Thus, during those intervals when the clutch plates 46—48 are in engagement, no motion will be imparted to the shaft 40, and the arm 41 will remain in contact with the stop 43. The clutch plate 34, being driven through the gears 35—38 from the clock shaft 36, will rotate at a speed corresponding to full load on the meter 37; and, during the first interval when plates 32 and 34 are in engagement, the shaft 25 will partake of such rotation that the radial arm 26 carried thereby will actuate the arm 21 and pinion 19 in a counter-clockwise sense, as indicated by the arrow A in Fig. 1, sufficiently to shift the arm 15 to its maximum position at the righthand end of the scale 16. The arm 26 is reset to zero under the influence of spring 27 at the termination of each interval of engagement of said plates 32 and 34. Since, during the alternate intervals, when the clutch plates 46—48 are in engagement, no rotary motion will be imparted to the shaft 40, there will be no tendency to return the pointer 15 toward the lefthand end of the scale. The pointer will, therefore, assume with respect to the scale 16, a position representative of the full load of the meter 37, or the maximum speed of the shaft 36.

It may now be assumed that the meter 37 is operating at a speed representing less than its full load. Under this condition, during each of those intervals when the clutch plates 32—34 are in engagement, the shaft 25 and its attached arm 26 will be advanced to a position bearing to the maximum deflection the same proportion as the then velocity of the shaft 36 bears to its maximum speed, and at the end of each of said intervals, the arm 26 will be reset to the stop 28. If, for example, the speed of the meter be ⅔ of its maximum speed, the arm 26 will be rotated from its zero position through an angle of ⅔ the maximum possible angle, and will have this excursion repeated during each of said intervals. Since in any such excursion, if the arm 21 does not occupy a position beyond the range of travel of the arm 26, the latter will engage the former, advancing it and the pinion 19 to a position corresponding to ⅔ the maximum deflection, it follows that the index or pointer 15 will assume a position ⅔ of the distance from the zero point to the maximum point of the scale 16.

Under the condition, when the meter is rotating at ⅔ of its full load speed, the gear member 54 and the bevel gear 50 will also be rotating at a corresponding velocity. The bevel gear 51, meanwhile, will continue to be driven at its normal speed corresponding to full load on the meter. Thus, the planetary member 49 will be rotated in a clockwise sense as indicated by the arrow B in Fig. 1, and at a velocity corresponding to ⅓ the maximum speed. During those alternate intervals when the clutch plates 46—48 are in engagement the shaft 40 and the arm 41 will be rotated to a corresponding degree, the arm 41 resetting to the stop 43 at the termination of each of said intervals. If the arm 22, attached to the pinion 20, should have reached a position in excess of ⅔ of the maximum excursion, said arm will be engaged by the arm 41 and forced back until it reaches a position corresponding to a pointer indication of ⅓ of the way down from the maximum point on the scale (i. e., ⅔ the full scale deflection). Thus, with the meter operating at ⅔ its full load, the pointer 15 will be subjected to alternate impulses, one tending to position said pointer ⅔ of the distance from the zero to the top point of the scale, and the other tending to position the pointer ⅓ of the distance from the top point of the scale toward the zero. In the same manner, it may be shown that for any steady load on the meter 37, the pointer 15 will be subjected to alternate influences tending to position it first up-scale and then down-scale and that both these influences tend to locate the pointer at the one indication representative of the speed of the meter. Should the load on the meter, and the speed of the shaft 36, vary during either or both of said intervals (as would normally be the case) the pointer 15 will be subjected to a continual averaging influence, with a tendency for the excess or deficiency of excursion from one end of the scale in comparison with the true value under measurement to be compensated for by a corresponding deficiency or excess of excursion from the other end of the scale.

In Fig. 6 is shown a method by which a device embodying the principles of the invention may be remotely operated through an electric circuit from contacts actuated by an "integrating" or "displacement" meter at a remote location. A ratchet wheel 80 forms a part of a mechanical train, and may for example, be made to replace the connection of the meter 37 to the shaft 36 shown in Fig. 2. A pawl 81 carried upon an arm 82 reciprocable about the axis of the ratchet wheel 80, serves to advance said ratchet wheel with each oscillation of the arm. A pawl 83, acting about a fixed center, serves to maintain said ratchet wheel in its advanced position and prevent retrogression with return movement of the arm 82. The pawls 81 and 83 and the arm 82 are independently restrained toward the positions shown, by spring or equivalent resilient means, not indicated in the drawing, whereby to constitute a conventional ratchet mechanism. An electromagnet 84, adapted to act upon a ferromagnetic armature 85 carried by the arm 82, serves by its energization and deenergization to impart reciprocatory movements to said arm. A meter 86, which may be a fluid-volume meter of the displacement class, a watt-hour meter, an anemometer, or any other form of integrating or counting meter, carries upon a shaft 87 a cam 88. Electrical contacts 89 adapted to be actuated by said cam and included in a circuit 90 with a source of electrical energy 91 and the electromagnet 84, serve to render said magnet responsive to the rotation of the shaft 87 to advance the ratchet wheel 80 and the shaft 36 at a rate proportional to the speed of the meter 86, and therefore to the rate of flow of the medium measured thereby. The mechanism associated with, and driven by, the shaft 36, being identical with the apparatus set forth in the explanation of the previous figures of the drawings, the combination shown in Fig. 6 provides means for effecting an indication or a displacement of a movable member which shall represent over a predetermined interval of time the mean of the quantity measured by said meter at a location remote from the indicating equipment.

While, in the interest of simplicity, the invention has been shown as of a form in which the shafts or spindles 25 and 40 are driven through the medium of flat-faced friction clutches, it will be obvious that the same action may be obtained by means of any of a variety of forms of clutches, without departing from the spirit of the invention. In fact, there may be substituted for said clutches their equivalent in the form of differential trains each having a free element subject to braking, as fully disclosed and set forth in U. S. Letters Patent No. 2,040,918, granted to Carlton W. Bristol, May 19, 1936.

The speed of rotation of the shaft 70 will depend upon the selected ratio of gearing between said shaft and its drive shaft 60; and this speed will be chosen in accordance with the essential purpose to which the apparatus is to be applied. Upon said speed will depend the time intervals of engagement of the respective clutches 32—34 and 46—48; and, whether said intervals be short or long, they will remain mutually equal. It will be apparent, moreover, that with changes in the elected speed of the shaft 70, it will be necessary, in order that the range of the instrument be consistent with the scale length, to make corresponding modifications in the ratios between the pinions carried by the shaft 36 and the gears 35 and 54 respectively.

Where the apparatus is employed with a principal object of obtaining a record of rate-of-flow or other magnitude actuating the meter 37 or 86, it is usually desirable that the successive averages be taken over time periods as short as practicable, and intervals of the order of 30 seconds or less for the engagement of each clutch will generally be found expedient for such purposes. The measurement of "demand," as characterizing any variable magnitude, differs essentially from other measurements in that definite cognizance is taken of the time of response of the deflecting element to changes in the magnitude of the variable, this time generally being of a duration much greater than would characterize a conventional indicating or recording instrument. Time intervals of 10 minutes or more are quite common in the determination of demand on electrical power loads. (For a further discussion of demand determination as relating to other forms of measurement, see "Measurement of Maximum Demand and Determination of Load Factor": P. A. Borden; Transactions A. I. E. E., vol. XXXIX, 1920, pages 1847 to 1894.) Where the instrument is required to fulfill the function of a demand meter, there will ordinarily be interposed between the shafts 60 and 70 such gearing as will provide substantially more extended time intervals of clutch engagement, such as 10 minutes or more for each clutch. Furthermore, when used as a demand meter, there may be provided in conjunction with the pointer arm 15 a manually resettable "maximum" pointer movable by said arm toward the upper end of the scale, for the purpose of indicating the maximum mean velocity of meter 37 or 86 during any one of the selected time intervals since the pointer was last reset.

It will furthermore be evident that the shaft 70 need not be driven by the same clock mechanism that actuates the gear 55, and that it may, instead, be operated by a separate constant-speed mechanism, if desired.

Also, it will be apparent that the arm 15 may, if desired, be equipped with a pen or stylus for making a record on a chart driven at constant speed, as in recording mechanisms of conventional types. If relatively short time intervals are incorporated in the mechanism of the invention, the resulting graph made by the stylus would correspond substantially to the record of a rate-of-flow meter, or a wattmeter or recording instrument of the conventional type measuring the same quantity as is passed through the meter. If, on the other hand, the clutch engagements are characterized by relatively long intervals, the graph provides a record of demand, and the maximum excursion of the stylus in any selected portion of the record provides a measure of the maximum demand during that period.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:
1. Apparatus for measuring the average velocity of a moving member, comprising a deflectable element, means for driving said element at a velocity proportional to that of said member, a second deflectable element, means for driving said second deflectable element in accordance with the difference between a constant predetermined velocity and the velocity of the first mentioned means, means for rendering the first mentioned driving means effective upon the first deflectable element in alternate intervals of unvarying duration, means for rendering the second mentioned driving means effective upon the second deflectable element in intervals of unvarying duration intervening the first mentioned intervals, and means controlled by said deflectable elements for exhibiting the average velocity of said member.

2. Apparatus for measuring the average velocity of a moving member, comprising a pair of clutch means, means for establishing said clutch means alternately for unvarying time intervals, means for driving one of said clutch means in accordance with the velocity of said member, means for driving the other clutch means in accordance with the difference between a constant predetermined velocity and the velocity of the first driving means, and means controlled jointly by said pair of clutch means for exhibiting the average velocity of said member.

3. Apparatus for measuring the average velocity of a moving member, comprising a first deflectable element, means for repeatedly and for uniform time intervals advancing said element from a predetermined zero position at a rate proportional to said velocity and subsequently resetting the same to said zero position, a second deflectable element, means for repeatedly and for uniform time intervals alternating with the first mentioned intervals advancing said second element from a predetermined zero position at a rate proportional to the difference between said velocity and a predetermined constant velocity and subsequently resetting the same to said zero position, an exhibiting member, and means controlled by said deflectable elements for positioning said exhibiting member.

4. Apparatus for measuring the average velocity of a moving member, comprising a first deflectable element, means for repeatedly and for uniform time intervals advancing said element from a predetermined zero position at a rate proportional to said velocity and subsequently resetting the same to said zero position, a second deflectable element, means for repeatedly and for uniform time intervals equal to and alternating with the first mentioned intervals advancing said second element from a predetermined zero position at a rate proportional to the difference between said velocity and a predetermined constant velocity and subsequently resetting the same to said zero position, an exhibiting member, and means controlled by said deflectable elements for positioning said exhibiting member.

5. Apparatus for measuring the mean velocity of a moving member, comprising means for establishing equal successive intervals of time, a first deflectable element, means for advancing said element during alternate ones of said intervals and at a rate proportional to said velocity, a second deflectable element, means for advancing said second element during intervals alternating with said first-named intervals and at a rate proportional to the difference between said velocity and a predetermined constant velocity, an exhibiting member, and means controlled by said deflectable elements for positioning said exhibiting member.

6. Apparatus for measuring the average velocity of a moving member, comprising a pair of deflectable elements, means operable at a predetermined constant velocity, means operable at a variable velocity corresponding to that of said member, means for establishing a driving connection between said variable velocity means and one of said deflectable elements, differential means continuously operable in accordance with the difference between said constant velocity and said variable velocity, means for establishing a driving connection between said differential means and the other of said deflectable elements, means for operating the respective connection-establishing means to establish said driving connections to said deflectable elements alternately and for unvarying time intervals, and means controlled by said deflectable elements for exhibiting the average velocity of said member.

7. Apparatus for measuring the average velocity of a moving member, comprising a deflectable element, driving means continuously operable at a velocity corresponding to that of said member, a second deflectable element, driving means continuously operable in accordance with the difference between a constant predetermined velocity and the velocity of the first mentioned means, means for rendering the first mentioned driving means effective to drive the first deflectable element in one direction in alternate intervals of unvarying duration, means for rendering the second mentioned driving means effective to drive the second deflectable element in the opposite direction in intervals of unvarying duration intervening the first mentioned intervals, and means controlled by said deflectable elements for exhibiting the average velocity of said member.

8. Apparatus for measuring the average velocity of a moving member, comprising a first mechanical train and a second mechanical train including first and second clutch means and first and second impelling members respectively adapted to be driven through said trains when said respective clutch means are in engagement, and means for setting said impelling members to pre-established zero positions when said clutch means are disengaged, an exhibiting element, means whereby said exhibiting element may be positioned alternatively by the respective impelling members, means operatively connecting said first train to said moving member whereby its impelling member may be driven at a rate proportional to said velocity when said first clutch means is engaged, means connecting said second mechanical train to said moving member whereby its impelling member may be driven at a rate proportional to the difference between said velocity and a predetermined constant velocity when said second clutch means is engaged, and means for engaging said first and second clutch means for alternate and equal intervals of time.

9. Apparatus for providing an indication of the average velocity of a meter element, comprising an indicating member and a graduated scale in cooperative measuring relation thereto, a gear train including a first clutch, an impeller adapted to advance said indicating member with respect to said scale and at a rate proportional to that of said meter element when said clutch is in operative engagement, means for setting said impeller to a predetermined zero position when said clutch is disengaged, means for alternatively engaging and disengaging said clutch for equal intervals of time, a second gear train including a differential having two sun wheels and a planetary member, a second clutch, an impeller adapted to advance said indicating member in a sense opposite to the influence of said first-named impeller and at a rate proportional to that of said planetary member when said second clutch is engaged and to be reset to a predetermined zero position when the same is disengaged, means for causing said second clutch to be engaged when said first clutch is disengaged and vice versa, means for driving one of said sun wheels at a rate proportional to that of said meter element and means for driving the other of said sun wheels at a predetermined constant rate.

PERRY A. BORDEN.

REFERENCES CITED

The following references are of record in the file of this patent:

UNITED STATES PATENTS

| Number | Name | Date |
|---|---|---|
| 928,635 | Dahl et al. | July 20, 1909 |
| 972,538 | Karapetoff | Oct. 11, 1910 |
| 1,303,244 | Boddie | May 13, 1919 |
| 1,764,340 | Oman | June 17, 1930 |
| 2,190,497 | Whitby et al. | Feb. 13, 1940 |
| 2,302,458 | Miner | Nov. 17, 1942 |

FOREIGN PATENTS

| Number | Country | Date |
|---|---|---|
| 6,256 | Great Britain | 1910 |
| 116,899 | Great Britain | June 17, 1918 |
| 577,342 | France | June 3, 1924 |